Figure 1:
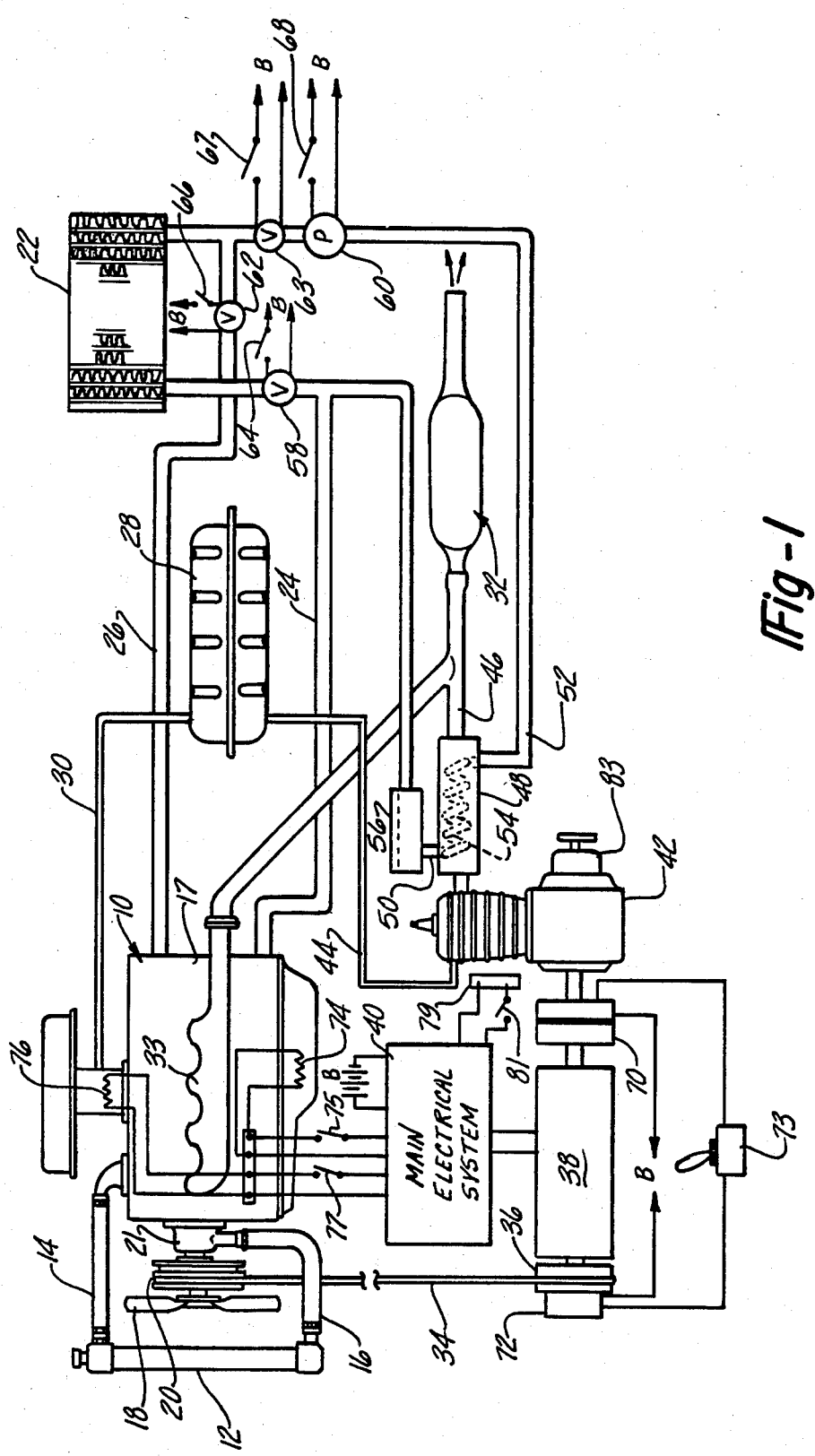

United States Patent [19]

Keedy

[11] Patent Number: 4,611,466
[45] Date of Patent: Sep. 16, 1986

[54] VEHICLE POWER SYSTEM COMPRISING AN AUXILIARY ENGINE IN COMBINATION WITH THE MAIN VEHICLE ENGINE

[75] Inventor: Edgar L. Keedy, Liberty Center, Ohio

[73] Assignees: Remi L. Victor; Mary H. Victor, both of Dearborn Heights, Mich.

[21] Appl. No.: 698,173

[22] Filed: Feb. 4, 1985

[51] Int. Cl.⁴ ............................................ F02D 25/00
[52] U.S. Cl. ........................................ 60/714; 60/718; 123/142.5 R; 237/12.3 B
[58] Field of Search ................. 60/708, 714, 718; 180/69.6, 165; 237/12.3 R, 12.3 B; 123/142.5 R; 290/4 R, 4 C

[56] References Cited

U.S. PATENT DOCUMENTS

| | | | |
|---|---|---|---|
| 2,070,615 | 2/1937 | Plante | 123/142.5 R |
| 2,972,056 | 2/1961 | Park et al. | |
| 3,105,708 | 10/1963 | Esty | |
| 3,191,050 | 6/1965 | Park | |
| 3,197,962 | 8/1965 | Suttles | |
| 3,201,934 | 8/1965 | Smith | |
| 3,458,710 | 7/1969 | Dodge | |
| 4,448,157 | 5/1984 | Eckstein et al. | 123/142.5 R |
| 4,531,379 | 7/1985 | Diefenthaler, Jr. | 60/714 X |

Primary Examiner—Stephen F. Husar
Attorney, Agent, or Firm—Harness, Dickey & Pierce

[57] ABSTRACT

A vehicle power system including an auxiliary engine in combination with the main vehicle engine with the auxiliary engine providing auxiliary electrical energy for the main vehicle electrical system and a source of thermal energy for heating the vehicle operating compartment.

10 Claims, 3 Drawing Figures

VEHICLE POWER SYSTEM COMPRISING AN AUXILIARY ENGINE IN COMBINATION WITH THE MAIN VEHICLE ENGINE

BACKGROUND

Summary of the Invention

The present invention relates to vehicle power systems and more particularly to a vehicle power system including an auxiliary engine in combination with the main vehicle engine.

With large automotive vehicles such as trucks, the main power system for providing motive power includes an internal combustion engine having a high output capacity in excess of around 200 horsepower. Frequently the vehicle operator on cross country trips will be required to make extended stops for rest, food, etc. During relatively cold conditions, the operator often leaves the engine running to avoid the problem of cold starting the engine and/or to maintain heat or air conditioning in the vehicle cab. Since these high capacity engines are relatively fuel inefficient, the result of keeping the engine running is a significant increase in operating expense and a reduction in engine life.

In the present invention, a low cost, fuel efficient, low power engine is provided in a unique combination with the main engine. As such the combination can provide a source of electricity and/or thermal energy for light, heat, and air conditioning to the vehicle cab or operating compartment for the comfort of the vehicle operator and/or passengers. The combination can also provide a source of electricity and/or thermal energy for heating the coolant, oil and air-intake of the main engine to facilitate cold starting.

In one form of the invention, the cooling system of the auxiliary power source can be used to assist in cooling of the main engine thereby inhibiting overheating of the main engine.

Therefore it is an object of the present invention to provide a power system comprising an auxiliary engine in a unique combination with a main vehicle engine whereby a source of electricity and thermal energy can be provided to the vehicle cab and main engine.

It is another object of the present invention to provide a power system comprising an auxiliary engine in a unique combination with a main vehicle engine whereby the cooling system of the auxiliary engine can be used to support the cooling system of the main engine.

It is a general object of the present invention to provide a power system comprising an auxiliary engine in a unique combination with a main vehicle engine.

Figure 2:
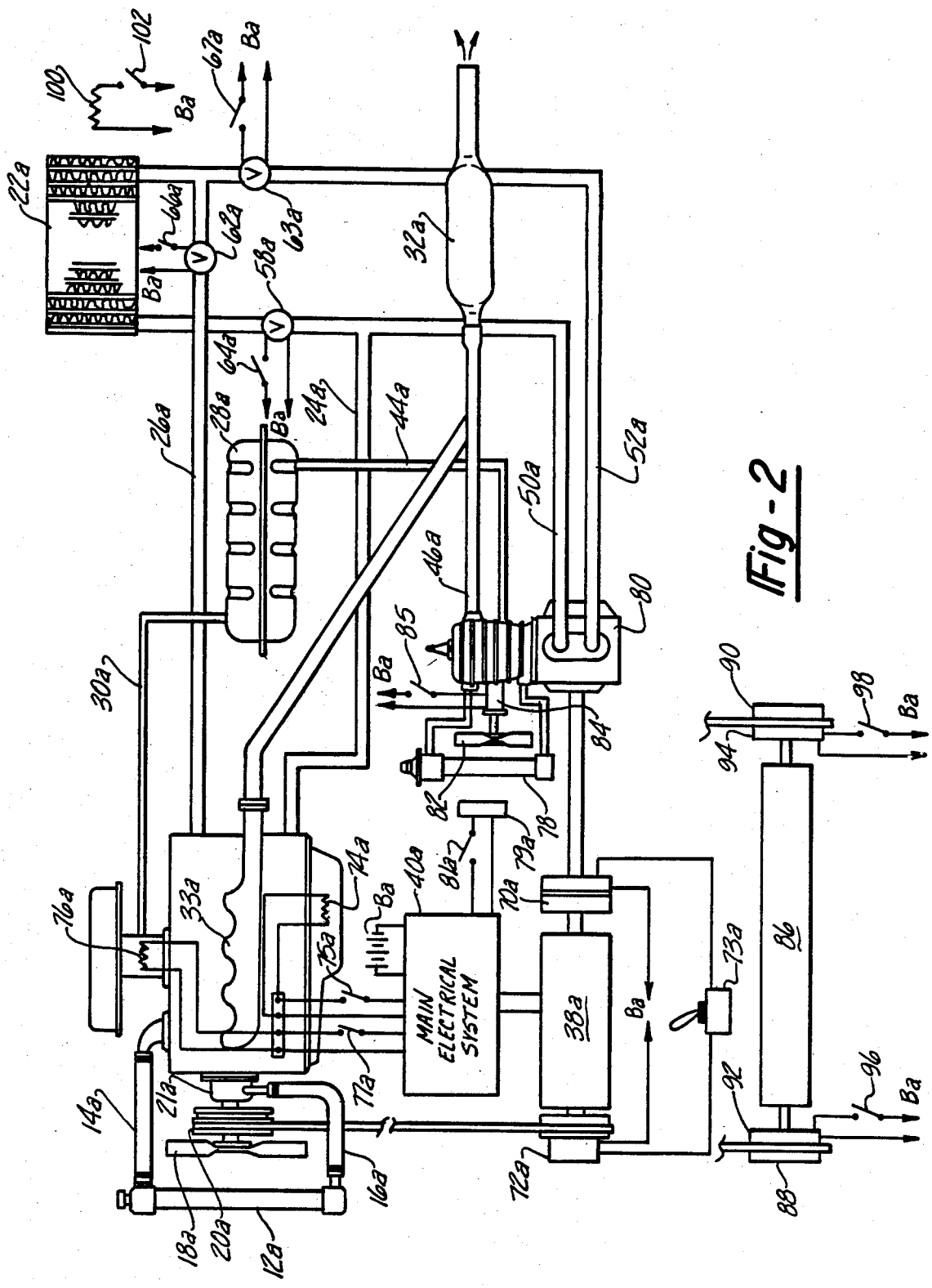
Figure 3:
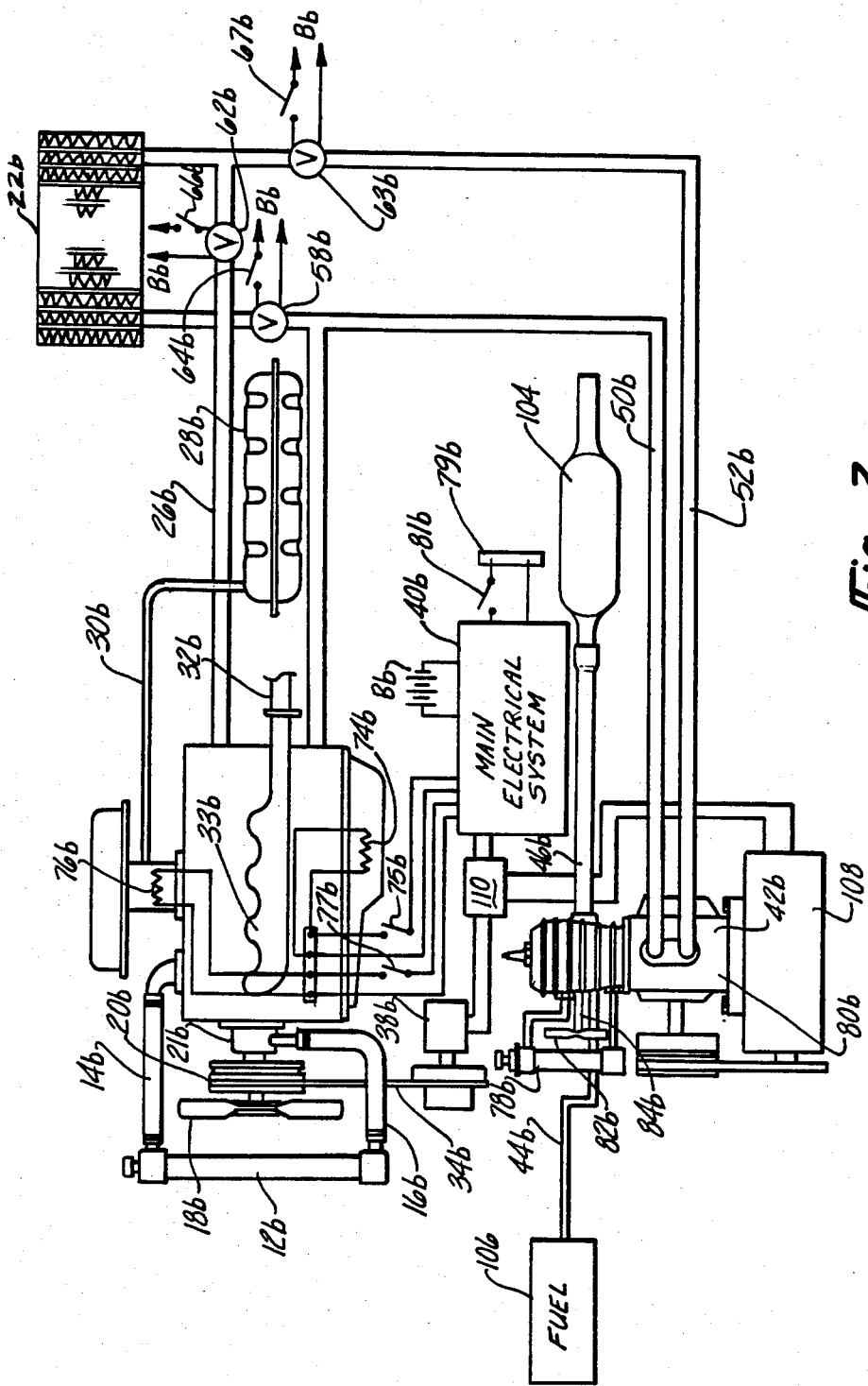

Other objects, features, and advantages of the present invention will become apparent from the subsequent description and the appended claims, taken in conjunction with the accompanying drawings, in which:

FIG. 1 is a generally diagrammatic view depicting one form of power system utilizing a combination air cooled auxiliary engine and liquid cooled main vehicle engine with a common electrical generator;

FIG. 2 is a generally diagrammatic view depicting another form of power system utilizing a combination liquid cooled auxiliary engine and liquid cooled main vehicle engine with a common electrical generator; and FIG. 3 is a generally diagrammatic view depicting still another form of power system utilizing a combination liquid cooled auxiliary engine and liquid cooled main vehicle engine with separate electrical generators driven by each.

Looking now to FIG. 1, an automotive vehicle (not shown) includes a conventional main engine 10 as its main source of motive power. The engine 10 can be either gasoline or diesel powered and, in the relevant application of the present invention, would be in excess of around 200 horsepower.

The main engine 10 has a conventional cooling system including a radiator 12 with lines 14 and 16 connected to the engine block 17 of engine 10. A fan 18 is driven by the main engine 10 via a pulley 20 along with a water pump (21) for circulating the liquid coolant.

A heater core 22 is located adjacent the vehicle cab to provide heat to the cab in a conventional manner from the heated coolant via input line 24 and return line 26 from the engine block 17 of the engine 10.

Fuel for the main engine 10 is provided in a conventional manner from a main engine fuel tank 28 via a fuel line 30. A conventional main exhaust system 32 is connected to the exhaust manifold 33 of the main engine 10. The exhaust system 32 includes a muffler, etc.

A conventional generator or alternator 38 is driven by the main engine 10 via a belt drive 34 and pulley 36.

The generator 38 provides electrical energy to the vehicle's main electrical system 40. The electrical system 40 can be the conventional system including a battery B, voltage and current regulator, lights etc. and can provide the desired direct current voltage and/or alternating current voltage; the latter are well known to those skilled in the art and hence the details thereof have been omitted for purposes of simplicity.

The power system includes an auxiliary engine 42. As will be seen the auxiliary engine 42 is used in combination with the main engine system to provide thermal and electrical energy for heat and light to the vehicle cab and heat or cooling to the main engine 10. In the embodiment of FIG. 1, engine 42 is air cooled but operates from the same type of fuel as main engine 10 and hence is connected to the main engine fuel tank 28 via fuel line 44. The exhaust of engine 42 is connected to the main engine exhaust 32 via exhaust line 46 and hence will share the exhaust muffler, and fuel exhaust outlet with the main engine 10.

Auxiliary heat is provided to the vehicle cab or operating compartment via the thermal energy from the exhaust gases from the exhaust system of the auxiliary engine 42 which is connected with the main hot water heating system. Thus the auxiliary engine exhaust line 46 includes a heat exchanger assembly 48 which receives the hot exhaust gases through line 46. At the same time the main hot water system is connected to the heat exchanger assembly 48 via a fluid inlet line 50 and a fluid outlet line 52 connected to a coiled and/or finned tube portion 54 in the heat exchanger assembly 48. A hot water expansion tank 56 is located in the return line 50 and is connected to the hot water line 24 from the main engine 10 and to one side of the heater core 22 via a solenoid operated valve 58. The valve 58 is normally open, i.e. permitting fluid flow. An electric pump 60 is located in the line 52 which is also connected to main line 26 and to the opposite side of the heater core 22. A second solenoid valve 62 is located in the heater line 26 from the main engine 10. The valve 62 is normally open. A third solenoid valve 63 is located in line 52 at the outlet side of pump 60. The valve 63 is normally closed, i.e. blocking fluid flow. The solenoid valves 58, 62 and 63 are actuated via switches 64, 66 and 67 respectively, which can be located in the vehicle cab. Similarly the pump 60 can be actuated via switch 68.

For conventional operation of the heating system when the vehicle main engine 10 is operating, the switches 64, 66, 67 and 68 will be open whereby the valve 62 will be open, valve 58 will be open and valve 63 will be closed. Now the heated water or coolant from the main engine 10 will be circulated solely through the heater core 22 via lines 24 and 26 with normally closed valve 63 blocking circulation to the auxiliary heating system. When the vehicle is stopped and the main engine 10 is turned off, the auxiliary engine can be started. To provide heat to the cab, however, it is desirable to limit the amount of water or coolant to be heated and circulated by the auxiliary heating system. Thus the valve 62 can be closed by actuating switch 66 and with the pump 60 energized by closing the switch 68 water as now heated by the heat exchanger assembly 48 will provide the thermal energy solely to the heater core 22 for providing heat to the vehicle cab.

In order to provide heat more quickly, the water or coolant in the auxiliary system can be preheated by the hot water from the main cooling system. To accomplish this, the normally closed valve 63 is opened by actuating switch 67 and the main engine 10 is maintained on for a few minutes while pump 60 is kept off. When the water in the auxiliary heating system is heated via the main engine 10, the main engine 10 is turned off and the auxiliary engine 42 started and the appropriate valves (58, 62 and 63) are conditioned to circulate the water heated by the auxiliary engine 42 solely to the heater core 22.

When it is desired to again start the main engine 10, it may be desirable to heat the engine block 17. In this case the core 22 is isolated from the auxiliary heating system and the hot water is directed solely to the engine block 17. This is accomplished by actuating switch 64 to close the normally opened valve 58 and actuating switch 66 to open the valve 62. Now with valve 63 open and pump 60 energized the heated water of the auxiliary system will be circulated around the heater core 22 and to the main engine block 17 to facilitate cold starting.

It is also important that electrical power be available to the vehicle cab for lights, heater fan, etc. In the embodiment of FIG. 1 this is accomplished via the main engine generator 38.

Thus the auxiliary engine 42 is coupled to the generator 38 via an electrically actuated clutch 70. At the same time the pulley 36 is also connected to the generator 38 via an electrically actuated clutch 72. A switch 73 located in the vehicle cab is actuable to alternately actuate clutches 70 or 72 whereby the generator 38 will be driven either by the main engine 10 via drive belt 34, pulley 36 and clutch 72 or by the auxiliary engine 42 via clutch 70. Alternatively, clutches 70 and/or 72 could be mechanically actuable or of the over-riding type. Now with the main engine 10 turned off and the auxiliary engine 42 actuated the main electrical system 40 will continue to receive sufficient electrical energy for lights, heater fan, etc. while also maintaining the charge on the battery. At the same time the oil supply of the main engine 10 can be heated via oil heater plug 74 and the air-intake to the main engine 10 can be heated via a resistance type heater 76. Oil heater plug 74 and air intake heater 76 can be energized via switches 75 and 77, respectively.

Thus, starting of main engine 10 is greatly facilitated since the engine block and oil supply can be heated via the auxiliary engine 42. Also during starting of the main engine 10 (with electrically actuated clutches 70, 72), the generator 48 can be maintained uncoupled from the main engine 10 and can be continued to be driven by the auxiliary engine 42. This will also maintain a high starting voltage to further facilitate engine starting. At the same time the auxiliary heating system can be conditioned to turn the pump 60 off and isolate that system from the main cooling (heating) system of the main engine 10. The reverse will be true for facilitating starting of the auxiliary engine 42 while the main engine 10 is running, i.e. starting voltage maintained high.

The auxiliary engine 42 has an electrical system 79 (including ignition, etc.) energized from the main vehicle electrical system 40 via switch 81. While engine 42 is of the electric start type, it also is provided with a pull start assembly 83. Thus even if the battery B in the main electrical system 40 is dead, the auxiliary engine 42 can be manually started; in this way the comfort of the operator could be maintained and/or the main engine 10 started via the electrical energy generated by the auxiliary engine 42 via the generator 38.

Another benefit of the engine combination of FIG. 1 can be secured for hot weather and/or heavy operating load conditions. Additional cooling can be obtained by connecting the main engine cooling system to the auxiliary heating (cooling) system when the main engine 10 is driving the vehicle and the auxiliary engine 42 is off. Now the coolant from the engine 10 will be circulated through the heat exchanger assembly 48 which, with engine 42 off, will tend to assist in further cooling the coolant.

As noted the main engine 10 generally would be in excess of around 200 h.p. while the auxiliary engine 42 would be of a low capacity around 3 to around 10 h.p. Thus it can be seen that an economical combination is provided whereby the vehicle operator can maintain comfort in the cab while still facilitating cold starting of the main engine. The result is a savings of fuel and an increase in usable life of the main engine 10.

FIG. 2 depicts a modified form of the invention in which the auxiliary engine is liquid or water cooled. Thus in the description of the embodiment of FIG. 2 components similar to like components and serving similar functions to those of FIG. 1 have been given the same numeral designation of the letter postscript "a". For purposes of simplicity, however, only those portions of the embodiment of FIG. 2 which are different from that of FIG. 1 will be described.

Thus in FIG. 2, the auxiliary engine 42a is water cooled with the cooling system including a radiator 78 connected to the auxiliary engine block 80. A cooling fan 82 is driven via a clutch 84 which can be electrically actuated via a switch 85. Thus for hot weather application the fan 82 may be energized while in cold weather situations it can be de-actuated to facilitate heating. The water pump (not shown) of auxiliary engine 42a will circulate the hot water through the radiator 78 and, for providing auxiliary cab heat can also circulate the heated water through the heater core 22a. Thus the cooling system of engine block 80 is connected to the heater core 22a via lines 50a and 52a. Auxiliary heater line 52a is connected to main engine heater line 26a while auxiliary heater line 50a is connected to main engine heater line 24a. A first solenoid actuated valve 62a is located in the main heater line 26a while a second solenoid actuated valve 58a is located in auxiliary line 50a and between the connection with main heater line 24a and the heater core 22a. A third solenoid actuated valve 63a is located in the auxiliary heater line 52a. Valves 58a, 62a and 63a are actuated by cab located switches 64a, 66a and 68a respectively. The valves 58a and 62a are normally open while valve 63a is normally closed.

Thus for conventional operation of the heating system when the vehicle main engine 10a is operating, the switches 64a, 66a, and 67a will be open whereby valves 58a and 62a will be open and valve 63a will be closed. Now the heated water or coolant from the main engine 10a will be circulated solely through the heater core 22a via lines 24a and 26a with normally closed valve 63a blocking circulation to the auxiliary heating system. When the vehicle is stopped and the main engine 10a is turned off, the auxiliary engine 42a can be started. Again, it is desirable to limit the amount of water or coolant to be heated and circulated by the auxiliary heating system. Thus the valve 62a can be closed by actuating switch 66a and with valve 63a open via switch 67a, water or coolant as now heated by the auxiliary engine 42a will provide the thermal energy solely to the heater core 22a for providing heat to the vehicle cab.

In order to provide heat more quickly, the water or coolant in the auxiliary system can be preheated by the hot water from the main cooling system. To accomplish this, the normally closed valve 63a is opened by actuating switch 67a and the main engine 10a is maintained on for a few minutes while auxiliary engine 42a is kept off. When the water in the auxiliary heating system is heated via the main engine 10a, the main engine 10a is turned off and the auxiliary engine 42a started and the appropriate valves (58a, 62a and 63a) are conditioned to circulate the water heated by the auxiliary engine 42a solely to the heater core 22a. Note that this also facilitates cold starting of the auxiliary engine 42a since its engine block 80a will now be heated. To further enhance heating the auxiliary engine fan 82 can be disabled via clutch 84 by actuating switch 84.

When it is desired to again start the main engine 10a, it may be desirable to heat the engine block 17a. In this case the core 22a is isolated from the auxiliary heating system and the hot water is directed solely to the engine block 17a. This is accomplished by actuating switch 64a to close the normally opened valve 58a and actuating switch 66a to open the valve 62a. Now the heated water of the auxiliary system can be circulated to the main engine block 17a to facilitate cold starting.

Electrical power in conjunction with the vehicle electrical system 40a including battery Ba, will be available to the vehicle cab for lights, heater fan etc. in the same manner as with embodiment of FIG. 1 via main generator 38a. Also the auxiliary engine electrical system 79a will be energized by the main engine and vehicle electrical system 40a.

As before, the oil supply of the main engine 10a can be heated via oil heater plug 74a and the air-intake to the main engine 10a can be heated via a resistance type heater 76a.

Again, starting of main engine 10a is greatly facilitated since the engine block and oil supply can be heated via the auxiliary engine 42a. Also during starting of the main engine 10a, the generator 48a can be maintained uncoupled from the main engine 10a and can be continued to be driven by the auxiliary engine 42a. This will also maintain the starting voltage available high to further facilitate engine starting. (The reverse is true for facilitating starting of the auxiliary engine 42a). At the same time the auxiliary heating system can be conditioned to be isolated from the main cooling (heating) system of the main engine 10a.

Another benefit of the engine combination of FIG. 2 is for hot weather and/or heavy load conditions. Additional cooling can be obtained by connecting the main engine cooling system to the auxiliary heating (cooling) system when the main engine 10a is driving the vehicle and the auxiliary engine 42a is off. Now the coolant from the engine 10a will be circulated through the auxiliary engine block 80 and radiator 78 which, with engine 42a off, will assist in further cooling the coolant.

As with the embodiment of FIG. 1, in the system of FIG. 2 the exhaust line 46a can be connected to main engine exhaust system 32a.

For providing air conditioning to the vehicle cab the auxiliary engine 42a and main engine 10a can be connected to an air conditioning compressor 86 via pulleys 88 and 90, respectively, with the compressor 86 being alternately actuated via clutches 92 and 94 which are selectively electrically actuable via switches 96 and 98, respectively. Thus cooling can be provided to the vehicle cab via the air conditioning system even when the main engine 10a is turned off. In hot weather conditions the auxiliary engine 42a can be cooled with the fan 82 actuated and can be additionally cooled by connecting its cooling system to the main engine cooling system. The latter is accomplished by opening valve 62a and closing valve 58a.

In the event that the auxiliary water heat is inadequate for the vehicle cab a separate low power electrical heater 100 can be provided which is actuable via a switch 102.

FIG. 3 depicts still another form of the present invention. In FIG. 3 components similar to like components and serving similar functions to those in FIG. 2 have been given the same numerical designation with the addition of the letter postscript "b".

Looking now to FIG. 3, auxiliary engine 42b has its exhaust line 46b connected to separate exhaust system 104. The engine 42b will utilize a different type of fuel from that of the main engine 10b. Thus its fuel line 44b is connected to a separate fuel tank 106.

A separate generator 108 is driven by the auxiliary engine 42b. The generator 108 is connected to the main engine electrical system 40b, including battery Bb, via a switch box 110 which also connects the main generator 38b to the electrical system 40b. Switch box 110 is actuable in one condition to connect the main generator 38b to and disconnect the auxiliary generator 108 from the electrical system 40b and is actuable in a second condition to do the opposite.

Even though the main engine 10b and auxiliary engine 42b are connected to separate generators 38b and 108, respectively, starting of each will still be facilitated since with the engine being started its generator will be under a no load condition while the starting voltage will still be maintained high by the other running engine to facilitate cranking and starting.

The cooling systems are interconnected in the manner shown and described in the embodiment of FIG. 2.

Thus with the system shown and described a unique combination of main engine and auxiliary engine for a vehicle is provided which results in ultimate gain in efficiency and economy.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a vehicle having a main internal combustion engine for driving the vehicle and an electrical system and having a main liquid cooling system connected to the main engine and having fluid passage means for circulating liquid coolant of the cooling system through the engine block of the main engine, and with the vehicle having an operating compartment and further having a vehicle heating system selectively actuable for providing heat to the operating compartment from the main engine cooling system, the combination comprising an auxiliary internal combustion engine, an auxiliary liquid cooling system connected to said auxiliary engine and connected to said main liquid cooling system, heat transfer means selectively actuable for connecting the vehicle heating system to said auxiliary liquid cooling system for transferring the heat absorbed from said auxiliary engine to the vehicle compartment heating system, said heat transfer means being selectively actuable to a first condition to circulate the liquid coolant for the auxiliary cooling system to the compartment heating system and blocking flow from the auxiliary cooling system to the engine block via said fluid passage means, said heat transfer means being selectively actuable to a second condition to circulate the liquid coolant of the cooling system from said heat exchanger to the engine block via said fluid passage means.

2. The invention of claim 1 with the vehicle electrical system including a first electrical generating device driven by the main engine, an auxiliary electrical system connected with said auxiliary engine and including a second electrical generating device driven by said auxiliary engine, and first switch means selectively operable for connecting either the first electrical generating device or said second electrical generating device to the vehicle electrical system.

3. The invention of claim 2 including second switch means selectively operable for connecting the vehicle electrical system to said auxiliary electrical system.

4. The invention of claim 3 with the main engine having a main exhaust system, said auxiliary engine having an auxiliary exhaust system, exhaust means connecting said auxiliary exhaust system to said main exhaust system whereby the exhaust from said auxiliary engine is dissipated through the main exhaust system.

5. The invention of claim 1 with the vehicle having a fuel source for supplying fuel to both the main engine and said auxiliary engine, main fuel system means for providing fuel from the fuel source to the main engine, auxiliary fuel system means for providing fuel from the fuel source to said auxiliary engine.

6. In a vehicle having a main internal combustion engine for driving the vehicle and having an electrical system including an electrical generating device adapted to be driven by the main engine, and having a liquid cooling system connected to the main engine and with the main cooling system having fluid passage means for circulating liquid coolant of the cooling system through the engine block of the main engine, and with the vehicle having an operating compartment and further having a heating system selectively actuable for providing heat to the operating compartment from the main engine cooling system, the combination comprising:

an auxiliary internal combustion engine, heat transfer means selectively actuable for connecting the heating system to the auxiliary engine for transferring the heat of combustion of the auxiliary engine to the compartment heating system said heat transfer means including a heat exchanger for transferring the heat of combustion of the auxiliary engine to provide heat to the compartment heating system, said heat exchanger having a fluid system with a liquid coolant connectible with the compartment heating system, said heat transfer means being selectively actuable to a first condition to circulate the liquid coolant for said fluid system from said heat exchanger to the compartment heating system and blocking flow of the liquid coolant for said fluid system to the engine block via said fluid passage means, said heat transfer means being selectively actuable to a second condition to circulate the liquid coolant of said fluid system from said heat exchanger to the engine block via said fluid passage means.

7. The invention of claim 6 with the main engine having a main exhaust system, said auxiliary engine having an auxiliary exhaust system, exhaust means connecting said auxiliary exhaust system to said main exhaust system whereby the exhaust from said auxiliary engine is dissipated through the main exhaust system.

8. The invention of claim 6 with the vehicle having a fuel source for supplying fuel to both the main engine and said auxiliary engine, main fuel system means for providing fuel from the fuel source to the main engine, auxiliary fuel system means for providing fuel from the fuel source to said auxiliary engine.

9. The invention of claim 6 with said auxiliary engine having an exhaust system and with said heat exchanger of said heat transfer means being connected to the auxiliary exhaust system for transferring the exhaust heat of combustion of the auxiliary engine to the liquid coolant of said fluid system.

10. The invention of claim 6 further comprising drive means for selectively connecting either said auxiliary engine or the main engine to drive the electrical generating device.

* * * * *